(12) United States Patent
McDowall

(10) Patent No.: US 7,562,987 B2
(45) Date of Patent: Jul. 21, 2009

(54) COMPLEX MIRROR PROJECTION DISPLAY

(75) Inventor: Ian McDowall, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 533 days.

(21) Appl. No.: 11/369,547

(22) Filed: Mar. 6, 2006

(65) Prior Publication Data

US 2007/0206160 A1 Sep. 6, 2007

(51) Int. Cl.
G03B 21/22 (2006.01)
G03B 21/28 (2006.01)
G03B 21/14 (2006.01)
G03B 21/56 (2006.01)

(52) U.S. Cl. ............................. 353/78; 353/99; 353/70; 359/460

(58) Field of Classification Search .................. 353/78, 353/98, 99, 69, 70; 359/460
See application file for complete search history.

(56) References Cited

U.S. PATENT DOCUMENTS

| 5,826,961 | A | 10/1998 | Kim et al. |
| 5,860,720 | A | 1/1999 | Negishi et al. |
| 6,176,584 | B1 | 1/2001 | Best et al. |
| 2004/0141157 | A1 * | 7/2004 | Ramachandran et al. ...... 353/70 |
| 2005/0174545 | A1 | 8/2005 | Lee |
| 2006/0227299 | A1 * | 10/2006 | Hisada et al. ................. 353/77 |

* cited by examiner

*Primary Examiner*—Diane I Lee
*Assistant Examiner*—Magda Cruz
(74) *Attorney, Agent, or Firm*—Paul J. Backofen, Esq.; Crockett & Crockett

(57) ABSTRACT

A rear projection display according to the present disclosure includes a complex mirror as an optical element to simplify the optical design. The mirror may be symmetrical about at least one axis to require optimization of only half the optical system. The mirror may also provide a geometrically distorted image that may be corrected in software of the image generator. This display uses a mathematical formulation which inherently creates a surface which is symmetric about one linear axis but free form in an orthogonal axis.

5 Claims, 4 Drawing Sheets

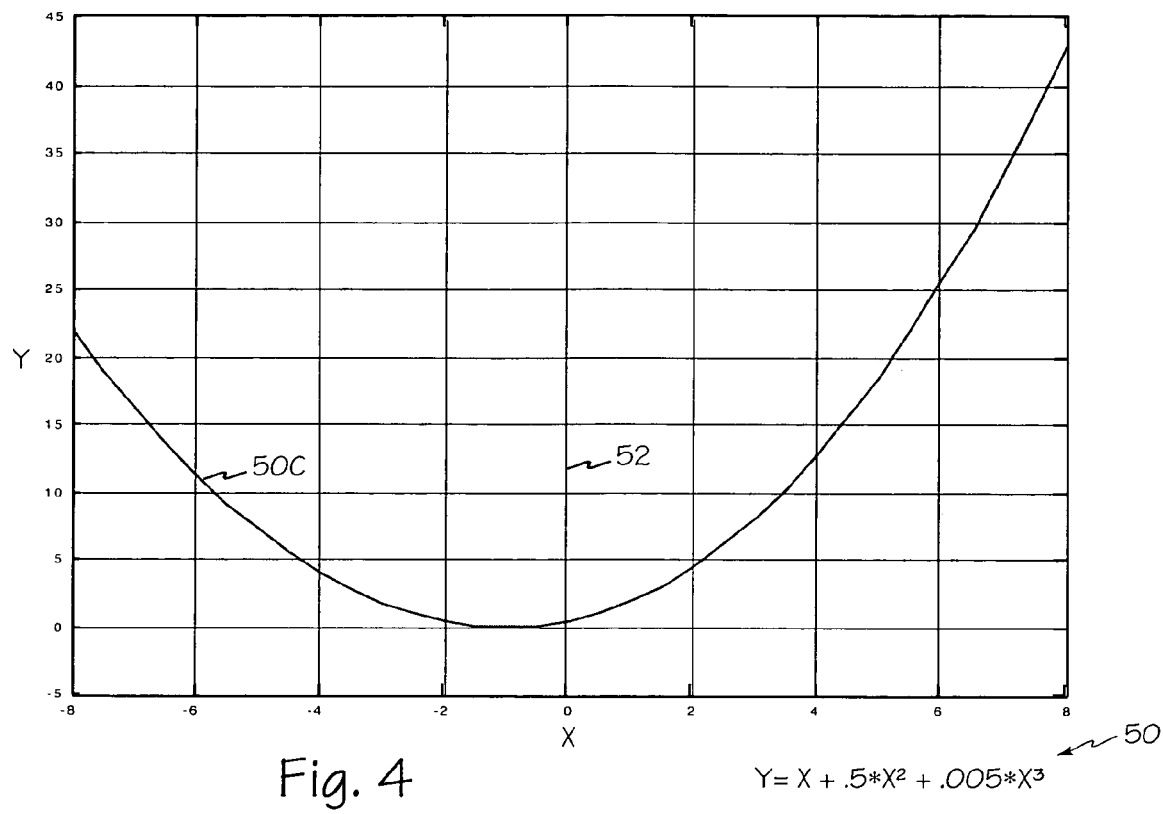
Fig. 4   $Y = X + .5*X^2 + .005*X^3$
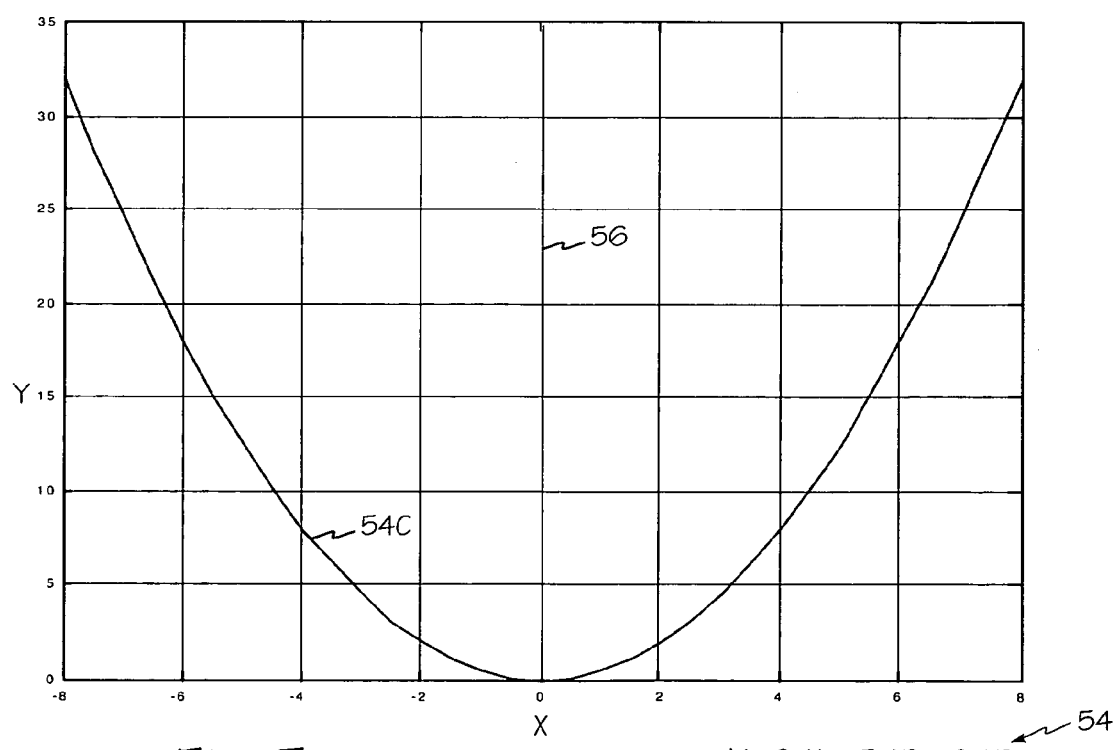
Fig. 5   $Y = 0*X + .5*X^2 + 0*X^3$

COMPLEX MIRROR PROJECTION DISPLAY

FIELD OF THE INVENTIONS

The inventions described below relate the field of optics and more specifically to optical systems and software for projection video displays.

BACKGROUND OF THE INVENTIONS

Big screen micro display based rear projection imaging systems, such as televisions and monitors are becoming increasingly popular with consumers. This is due to their combination of low weight, high picture quality, price, and reliability over comparable large display technologies such as cathode ray tube (CRT) based rear projection imaging systems, plasma displays, and direct view liquid crystal displays (LCD).

Micro display based rear projection imaging systems generally operate by shining a light on or through single or multiple micro displays (also known as imagers or light-valves) where an image is displayed. Micro display imagers, such as digital micro mirror devices (DMD) imagers, liquid crystal on silicon (LCoS) imagers, and LCD imagers, range from one half to one inch along their diagonal. The light that shines through or is reflected from a micro display forms a picture and is directed by projection optics onto the back surface of a transmissive display screen, thereby showing the picture from the micro display. In the process of displaying the picture on the screen the picture may be magnified 50 to 150 times, depending on the size of the micro display imager and the size of the screen.

Consumers are particularly interested in shallow rear projection monitors for aesthetic and space saving reasons. Reasonable manufacturing tolerances, cost, and optical limits, however, restrict the depth a rear projection monitor may achieve. One such optical limit is due to the high image magnification necessary to project images and the short distance, generally less than two feet, available to perform the magnification. In order to perform this level of magnification in a short light path distance, the use of very wide-angle optics is required. These lenses are expensive and complicated.

One solution to increasing the optical light path distance in a desired monitor cabinet depth is to use one or more mirrors to reflect the image from the micro display projector on to the screen. Adding a mirror or mirrors to an imaging system causes the optical light path to fold, increasing its effective length within a given front-to-back distance or depth.

Conventional rear projection imaging systems solutions generally utilize either one or two flat mirrors. In the single mirror case, the micro display projector points away from the rear projection monitor screen and shines on a mirror. The mirror then reflects the micro display projector's light rays on to the monitor screen. In the double mirror case, the micro display projector shines, sometimes in a direction parallel to the monitor screen, to a small first mirror. This first mirror then reflects the micro display projector's light rays on to a large second mirror, which directs the light rays to the monitor's screen. The second mirror is usually substantially parallel to the monitor's screen.

Image quality is an important consideration when a consumer purchases a rear projection imaging system. Consumers do not want to buy rear projection imaging systems that display warped, distorted, dim, or discolored images. Designers therefore spend a significant amount of time optimizing image quality given other design constraints, such as cabinet depth, system cost, and others. Flat perfect mirrors do not affect the optical properties of a system, other than allowing clever management of the optical light path in a system that has limited external dimensions. Therefore, most optical parameter considerations are addressed in the design of the optics on the micro display projector. Even in rear projection imaging systems using mirrors to lengthen the optical light path distance, these lenses are still very expensive to both design and manufacture, sometimes containing up to twenty-six elements.

Designers can, however, decrease the cost and complexity of the projection optics in the projector lenses by replacing the second mirror with an additional optical element. If the second mirror is replaced with a large curved mirror, the curved mirror will Form part of the optical projection system. The specific shape of the large curved mirror can be changed and optimized in conjunction with the projection lens to achieve a system which has lower overall complexity and cost in the refractive projection lens. Geometrical distortions and lateral color effects in the image can be taken care of in hardware and/or software through introducing compensating distortions in the video image as it passes through the electronics to the imaging device.

Designing the optical elements in a rear projection imaging system is usually done in two stages with the help of a software package such as Zemax, or Code V. The first stage is a rough design stage where optical components are selected and positioned within the system, perhaps using paraxial lens models, and the second stage is an optimization stage where components, exact optical materials and surface properties, distances between optical components, and the like are fine-tuned to optimize around a set of parameters. Lens optical elements are adjusted and the curved mirror's surface is varied in this stage. It is nearly impossible to produce a completely optimized imaging system, so the optimization stage relies on weighting specific parameters. These parameters may include imaging focus, the geometry of the displayed image, chromatic aberration, and the like, and are generally represented by a merit function.

Designing a curved mirror that allows a software package to converge to a workable solution during the optimization stage is difficult. Common functions describing a curved mirror's surface, such as spherical and aspherical functions, do not necessarily have enough degrees of freedom for the software package to find a "real" solution. For example, a software package, given an initial condition of a spherical mirror or the like, may optimize the rear projection imaging system by replacing lens elements with elements that have negative thickness.

Designing and optimizing an optical mirror from first principles can be time consuming and can produce undesired results unless certain initial conditions are established before designing the mirror. Accordingly, a need exists for an optimized complex mirror surface to enable simpler and cheaper optics to be used in rear projection displays.

SUMMARY

An optimized complex mirror surface allows a rear projection imaging system to be low cost, have high picture quality, and yet still have a shallow cabinet design. The use of a mirror as an optical element decreases the cost and complexity of the projector's optics. The optimal complex mirror used in a rear projection imaging system is symmetric with respect to the vertical centerline of the rear projection imaging system's screen. This symmetry means that a designer only has to model one half of the rear projection imaging system, consequently speeding up the optimization process.

The mirror only has to be symmetric about the rear projection imaging system's vertical centerline; constraining this degree of freedom and specifying the type of function that describes the mirror surface is a satisfactory number of initial conditions to allow an optical design software package to optimize the mirror's shape. The nature of the function constraint is to describe the mirror's surface in terms of a polynomial where the surface height of the mirror from flat (sag in optical terms) is defined by a surface parameterized over X (width) and Y (height). To enforce the symmetry about the vertical centerline of the mirror, a constraint is made in which all coefficients for polynomial terms which contain an odd power in X are set to zero and are not allowed to change during the optimization process.

A rear projection display according to the present disclosure includes a complex mirror as an optical element to simplify the optical design. The mirror may be symmetrical about at least one axis to require optimization of only half the optical system. The mirror may also provide a geometrically distorted image that may be corrected in software of the image generator or in electronics associated with the display system. This display uses a mathematical formulation which inherently creates a surface which is symmetric about one linear axis but free form in an orthogonal axis and also maintains smoothness such that no discontinuities occur.

A rear projection display according to the present disclosure may include an image projector projecting one or more images to be displayed, a first mirror reflecting the one or more images to be displayed from the image projector, a complex mirror having a shape symmetrical about a vertical axis and derived from a multi-order polynomial function, the complex mirror reflecting the one or more images to be displayed from the first mirror, and a display screen for displaying the one or more images to be displayed reflected from the complex mirror.

An alternate rear projection display according to the present disclosure may include an image projector projecting one or more images to be displayed through one or more optical elements, a first mirror reflecting the one or more images to be displayed from the image projector, a complex mirror having a shape derived from a two dimensional multi-order polynomial with the odd powers of the horizontal terms set to zero, the complex mirror reflecting the one or more images to be displayed from the first mirror and providing geometric distortion, a display screen for displaying the one or more images to be displayed reflected from the complex mirror, and display electronics controlling the image projector and distorting the one or more images to be displayed to cause the one or more images displayed on the display screen to be displayed without distortion.

Another alternate rear projection display according to the present disclosure may include an image projector projecting one or more images to be displayed on a first mirror, a complex mirror having a shape symmetrical about a vertical axis and derived from a multi-order polynomial function, the complex mirror reflecting the one or more images to be displayed from a first mirror, and a display screen for displaying the one or more images to be displayed reflected from the complex mirror.

BRIEF DESCRIPTION OF THE DRAWINGS

FIG. 4 is a graph of an example polynomial function containing odd powers of X according to the present disclosure.

FIG. 5 is a graph of an example polynomial function containing only even powers of X according to the present disclosure.

DETAILED DESCRIPTION OF THE INVENTIONS

Figure 1:
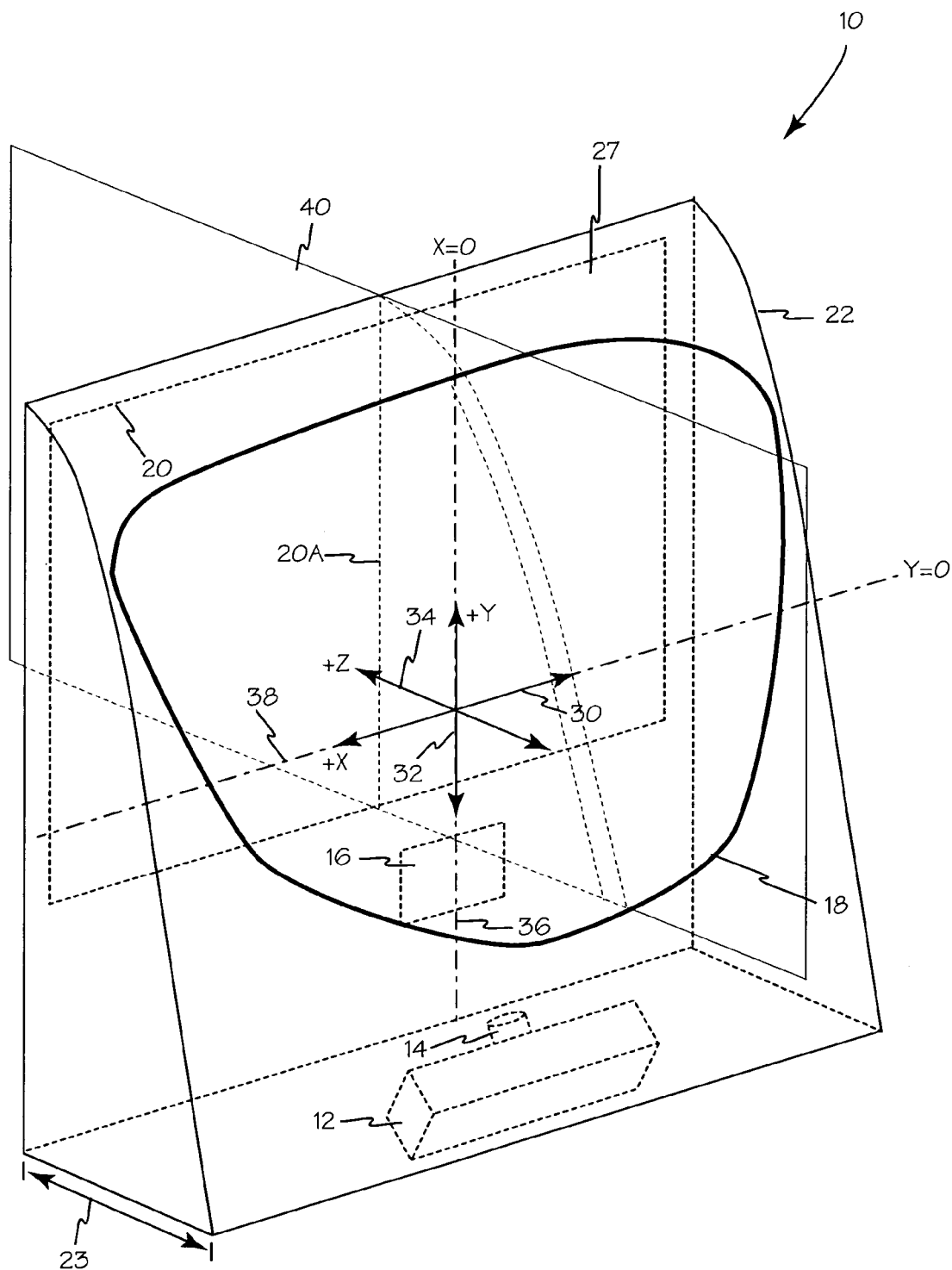
FIG. 1 is a rear perspective view of a rear projection monitor containing a mirror with an optimized complex surface according to the present disclosure.
Figure 2:
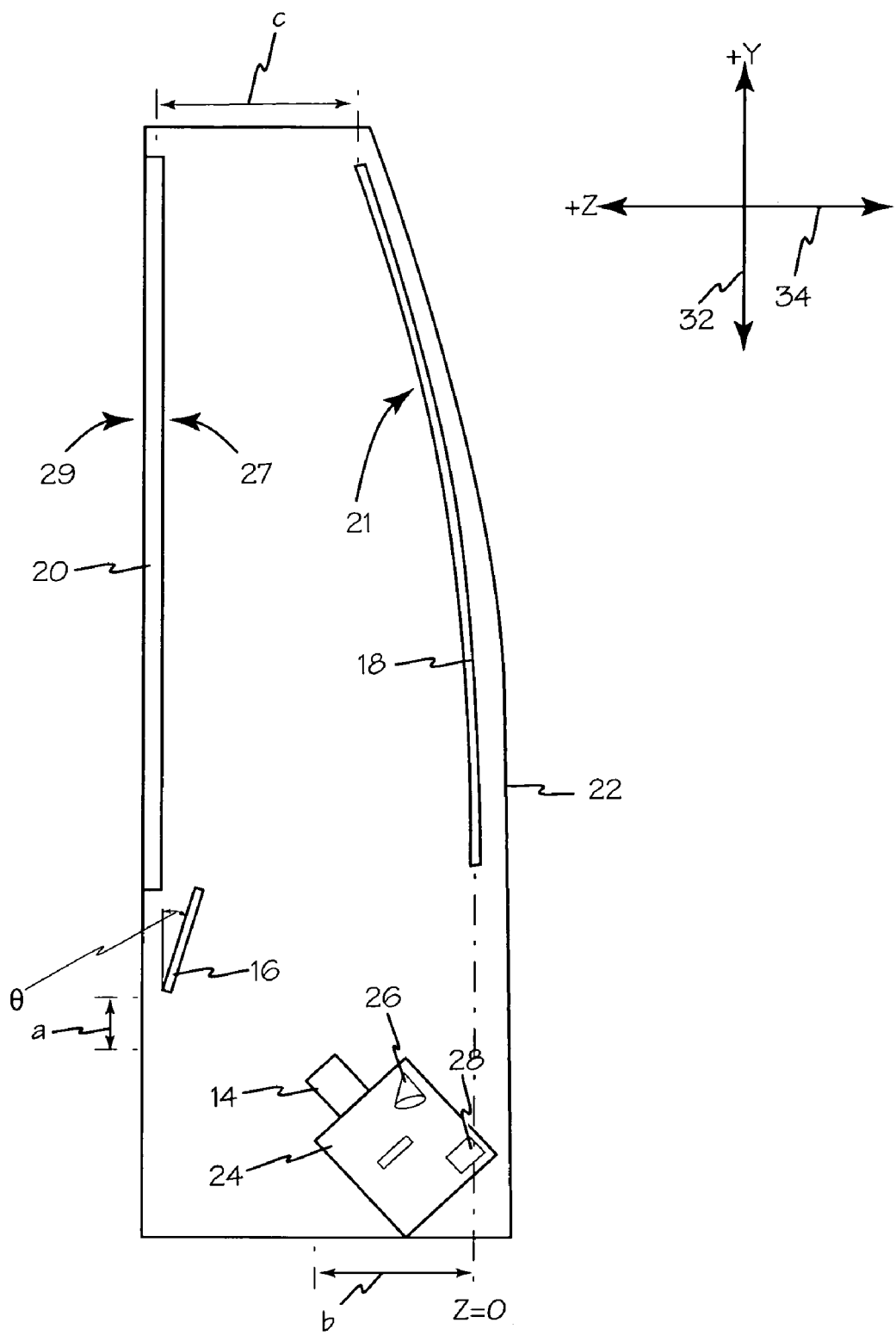
FIG. 2 is a side view of a rear projection monitor containing a mirror with an optimized complex surface according to the present disclosure.

Referring to FIGS. 1 and 2 rear projection display 10 is illustrated according to the present disclosure. Rear projection monitor 10 includes projector 12, projection optics 14, first mirror 16, complex mirror 18, and screen 20. Rear projection monitor 10 may be of the thin type in which depth 23 is less than twelve inches. X axis 30, Y axis 32, and Z axis 34 are illustrated for reference purposes.

Projection optics 14, first mirror 16, complex mirror 18, and screen 20 are positioned such that they are symmetrical with respect to Y-Z plane 40. Y-Z plane 40 is perpendicular to screen 20 and bisects the screen along the screen's vertical centerline 20A.

Projector 12 is a micro display based projector containing an imager 24, light source 26, and electronics 28. Imager 24 may be any suitable device or combination of devices such as liquid crystal on silicon (LCoS), a digital micro mirror devices (DMD) imager, or the like using one or more such imaging devices. For the purposes of illustration, imager 24 will be described throughout this application as if it is a single DMD imager, although those of skill in the art will appreciate that the invention is equally valid if imager 24 is an LCoS imager or any other suitable device, or multiple such suitable devices may be used. Light source 26 may be a halogen lamp and reflector, a high intensity discharge lamp and reflector, LED(s), laser, or the like. Electronics 28 are responsible for receiving signals from a video input device that contain one or more desired display images, resampling the images to convert them to pixel based images, and controlling the corresponding micro display pixels to display the images. The operation of a micro display based projector is familiar to those of skill in the art.

Although projection optics 14 are illustrated as a single element, projection optics 14 may include a number of lens elements. Projection optics 14 may include converging or diverging lens, mirrors, or the like. First mirror 16 may be a flat or curved mirror. The dimensions of first mirror 16, as well as inclination angle θ and relative dimensions a, b and c, may be tailored to meet the design criteria of rear projection monitor 10.

Screen 20 is flat and made from any suitable light-diffuse material and may include elements such as a fresnel lens, a diffuser sheet, or the like. Projector 12, projection optics 14, first mirror 16, and complex mirror 18 all cooperate to project images on to surface 27 of screen 20. A viewer sees the displayed images on surface 29 of screen 20.

Figure 3:
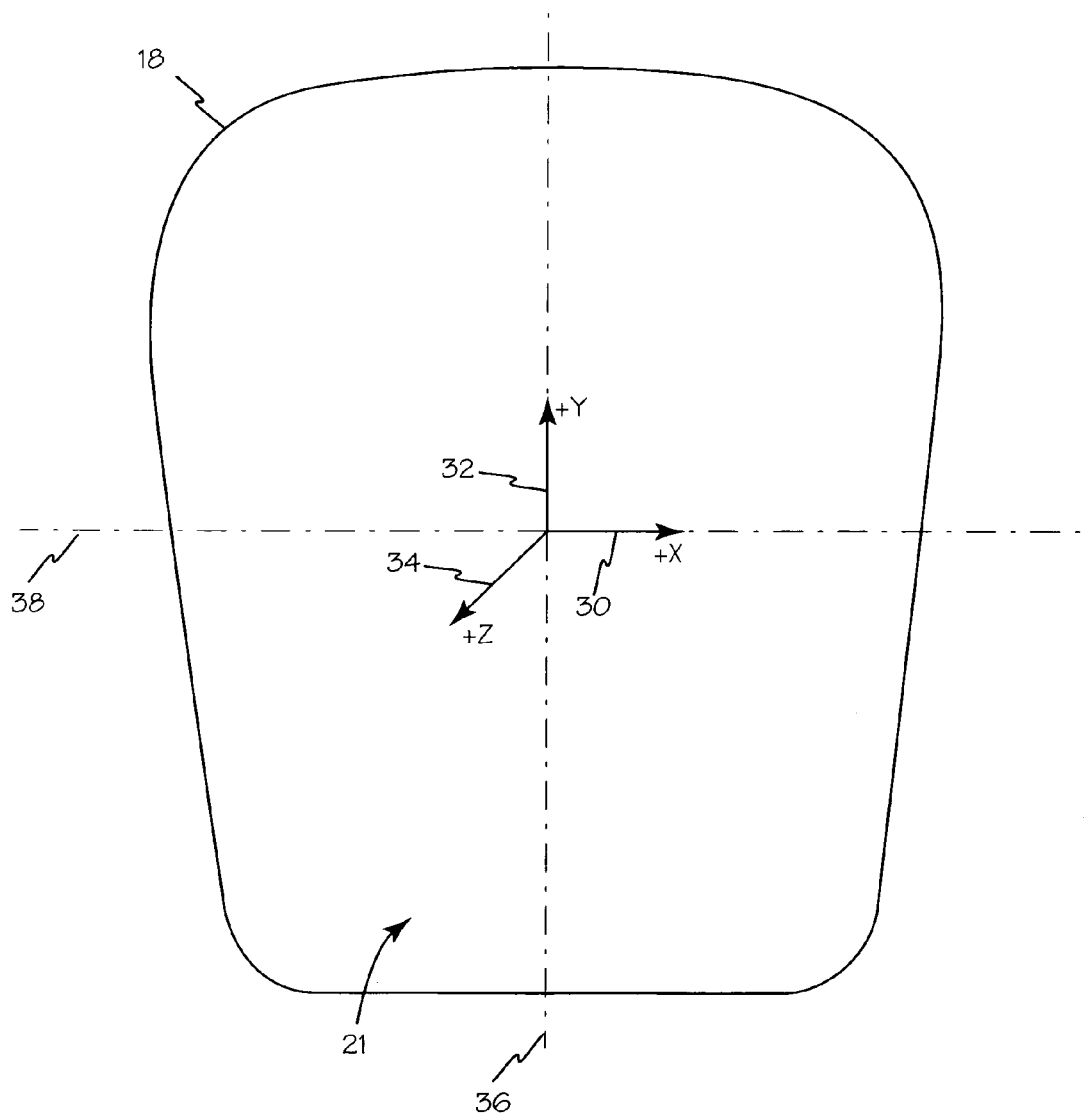
FIG. 3 is a front perspective view of an optimized complex mirror according to the present disclosure.

Referring now to FIG. 3, complex mirror 18 contains an optimized complex surface 21. Complex mirror 18 may be manufactured from any suitable material for example, from molded mirror plated glass, molded mirror plated acrylic, vacuformed, reflective film based, or the like. Surface 21 is an optimized complex mirror surface; the Z surface height is defined by the surface parameterized in the X and Y directions (as illustrated by X axis 30, Y axis 32, and Z axis 34). The mirror is symmetrical about vertical centerline 36, which represents where the X coordinates of surface 21 equal zero.

Surface 21 may be described in terms of any suitable multi-order, two-dimensional polynomial function. Those of skill in the art will recognize that a multi-order, two-dimensional polynomial function represents only one of many possible solutions and may be optimized to a particular imaging system and set of parameters for which it was developed. By setting the coefficients of any odd-powered X term in the polynomial to zero, symmetry of complex mirror 18 about vertical centerline 36 is enforced. This condition enables the optical components optimization process to efficiently converge on a workable solution.

Complex mirror 18, as illustrated in FIG. 3, may not be symmetrical about axis 38 (where the Y coordinates of surface 21 equal zero). Those of skill in the art will recognize that surface 21 may be reparameterized in the event that an additional axis of symmetry is desired for complex mirror 18. The plane of symmetry may be arbitrarily chosen through the reparameterization of the system.

The design process for imaging system 11 and the layout of rear projection monitor 10 may entail two or more stages: a rough design stage and an optimization stage. Both stages are typically completed with the assistance of an optical design software package such as Zemax, Code V, or the like. With reference to FIGS. 1, 2, and 3, during the design stage individual optical components like projection optics 14 may be selected or modeled with paraxial lenses and distances and angles between components, such as the illustrated distances a, b, and c, and inclination angle θ, are roughly calculated. At this time the initial shape and main surface of complex mirror 18 are designed as well. This involves determining the initial maximum degree of the polynomial function that defines surface 21 (for example, the polynomial may be a 10th order polynomial in X and an 11th order polynomial in Y). Initial coefficients for the various terms of the polynomial are also determined; because it is known that surface 21 is symmetrical about vertical centerline 36, all coefficients of odd-powered X terms are set to zero and are not allowed to vary during optimization. This forces the mirror surface to be symmetrical about vertical centerline 36 and greatly reduces the number of degrees of freedom of the solution space.

FIGS. 4 and 5 illustrate why coefficients of odd-powered X terms must be set to zero in polynomial functions in order to make the mirror symmetrical and yet smoothly curved over the axis of symmetry. A polynomial function cannot be symmetrical about an axis where the independent variable equals zero if the function contains odd powers of that independent variable. This is because the function will not yield the same answer for positive and negative numbers with the same magnitude. The functions defining the curves in FIGS. 4 and 5 are both relatively low-power and contain only a single independent variable. These functions are provided for illustrative purposes only and do not represent optimized polynomial functions intended for use in defining suitable mirror surfaces according to the present disclosure.

FIG. 4 includes curve 50C which illustrates cubic function 50, $y=x+0.5*x2+0.005*x3$, that contains two odd powers of X, x1 and x3. The coefficients on these odd-powered x terms are not zero, thereby resulting in a curve 50C that is not symmetric about y axis 52, where x=0.

FIG. 5 includes curve 54C which illustrates function 54 that contains the same even powers of X as function 50 in FIG. 4 but with all the odd powers of X set to zero. Thus curve 54C now just illustrates $y=0.5*x2$. Function 54 is symmetric about y axis 56. Thus, as these two explicatory figures illustrate, it is necessary to force the coefficients of odd powers of X to zero in order to constrain the symmetry of complex mirror 18 about vertical centerline 36.

During the optimization process, all the individual optical components may be modified, the distances between components altered, and the coefficients on terms in the polynomial describing the surface of complex mirror 18 may be changed. With reference to FIGS. 1, 2, and 3, the optimization process is based around a merit function that ranks the importance of certain design parameters and then optimizes the given optical system based on these parameters. Such parameters might include the spot size of traces of ray bundles as they appear on screen 20, the distance between certain locations on the imager and where these appear on screen 20, chromatic aberration, allowable distance between optical components, and the like. In terms of final image results, optimizing the spot size and the relative distance between imager locations and where these appear on screen 20 affects, respectively, image focus and image geometry on screen. These two parameters are of significant importance in guaranteeing high image quality. Other parameters, such as the relative distance between optical components, may rank lower in the merit function; designers may tradeoff having a slightly deeper rear projection monitor cabinet in favor of better image quality. This merit function, along with certain initial conditions and constraints such as the imager size, screen size, degree of the polynomial function describing surface 21, the coefficients on odd powers of X being zero in the polynomial function describing surface 21, and the like, provide the software package with enough direction in order to converge on a suitable answer. In order to save time during the simulation process and encourage the software package to converge on a solution, only a limited number of locations on the imager are typically modeled.

Constraining all the coefficients on the odd powers of X to be zero in the polynomial function describing surface 21 during the optimization process allows the optimization process to run on only one of the symmetrical halves of imaging system 11. Due to the symmetrical nature of many rear projection imaging systems, the optimization process only has to focus on half of the imaging system, such as portion of the imaging system that displays on the left half of screen 20, thereby saving time or increasing the given number of imager pixels that are modeled in a given time. Assuming that all the optical components remain symmetrical during this process, an image will look correct on both sides of the screen once the process is complete.

By forcing coefficients on odd powers of X to be zero and specifying the degree of the polynomial function that describes surface 21, it is possible for the optimization process to converge on a workable, real solution. The optimization process will optimize any distorting effects reflected in the system's merit function in imaging system 11 by fine-tuning lens elements in projection optics 14 and carefully matching them to complex mirror 18, which is also modified. Polynomial functions have the advantage over sine and cosine functions of being easy to moderate in order to guarantee a symmetric mirror. Polynomial functions are also beneficial over spherical and aspherical functions because polynomial functions have enough degrees of freedom to converge on a workable solution in this application. Constrained polynomial functions are therefore an ideal solution when designing optical component mirrors for use in rear projection monitors.

An additional advantage of this approach is that the large curved mirror is far from the optical stop of the system which is typically in the lens close to the DMD device. Because the mirror is far from the optical stop, the surface quality of the mirror does not need to be as precise as it would need to be if it was located closer to the stop.

The polynomial representation and optimization of the surface by forcing the odd powers of X to zero has an additional non obvious benefit. In the optimization approach used by some software packages, only a limited number of locations or zones are optimized. An n'th degree polynomial has n roots so in the optimization of a general form n'th degree polynomial, tracing n or fewer zones may lead to a solution which performs well at the zones traced but not well in the area between samples. Thus, the optimization will tend to create a surface where the zones traced are (in terms of the merit metric) "good" but the areas between these zones may not be optimal. By forcing all terms with odd powers of x to 0, it would appear that the solution found does not fit as well at the specific zones but does achieve a better overall solution during the optimization process.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A rear projection display comprising:
   an image projector projecting one or more images to be displayed;
   a first mirror reflecting the one or more images to be displayed from the image projector;
   a complex mirror having a shape symmetrical about a vertical axis and derived from a two dimensional multi-order polynomial with the odd powers of the horizontal terms set to zero, the complex mirror reflecting the one or more images to be displayed from the first mirror; and
   a display screen for displaying the one or more images to be displayed reflected from the complex mirror.

2. The rear projection display of claim 1 wherein the complex mirror further comprises:
   a complex mirror having a shape derived from a two dimensional multi-order polynomial with the odd powers of the horizontal terms set to zero.

3. A rear projection display comprising:
   an image projector projecting one or more images to be displayed through one or more optical elements;
   a first mirror reflecting the one or more images to be displayed from the image projector;
   a complex mirror having a shape derived from a two dimensional multi-order polynomial with the odd powers of the horizontal terms set to zero, the complex mirror reflecting the one or more images to be displayed from the first mirror and providing geometric distortion;
   a display screen for displaying the one or more images to be displayed reflected from the complex mirror; and
   display electronics controlling the image projector and distorting the one or more images to be displayed to cause the one or more images displayed on the display screen to be displayed without distortion.

4. A rear projection display comprising:
   an image projector projecting one or more images to be displayed to a first mirror;
   a complex mirror having a shape symmetrical about a vertical axis and derived from a two dimensional multi-order polynomial with the odd powers of the horizontal terms set to zero, the complex mirror reflecting the one or more images to be displayed from the first mirror; and
   a display screen for displaying the one or more images to be displayed reflected from the complex mirror.

5. The rear projection display of claim 4 wherein the complex mirror further comprises:
   a complex mirror having a shape derived from a two dimensional multi-order polynomial with the odd powers of the horizontal terms set to zero.

* * * * *